United States Patent [19]
Frank

[11] 3,826,511
[45] July 30, 1974

[54] COLLAPSIBLE BEACH TOTE BARROW WITH BALL COMBINATION

[76] Inventor: William N. Frank, 487 Denslow St., Windsor Locks, Conn. 06096

[22] Filed: Nov. 17, 1972

[21] Appl. No.: 307,505

[52] U.S. Cl. ............................ 280/36 R, 280/47.31
[51] Int. Cl. ............................................ B62d 11/00
[58] Field of Search ............ 280/36 R, 47.31, 47.3, 280/47.32, 78

[56] References Cited
UNITED STATES PATENTS
| | | | |
|---|---|---|---|
| 2,494,199 | 1/1950 | Provitola | 280/36 R |
| 2,672,348 | 3/1954 | Scott | 280/36 R |
| 2,967,058 | 1/1961 | Hoffmann | 280/47.31 |

FOREIGN PATENTS OR APPLICATIONS
| | | | |
|---|---|---|---|
| 603,497 | 4/1960 | Italy | 280/47.31 |

Primary Examiner—Robert R. Song
Attorney, Agent, or Firm—Norman Friedland

[57] ABSTRACT

This invention relates to a collapsible beach tote cart fabricated from tubular aluminum having means for releasably securing the wheel combining as a beach ball and having folding means securing the frame elements so as to permit the main side frame structure to be collapsible and movable relative to each other to form a compact, easily storable unit.

4 Claims, 8 Drawing Figures

PATENTED JUL 30 1974 3,826,511
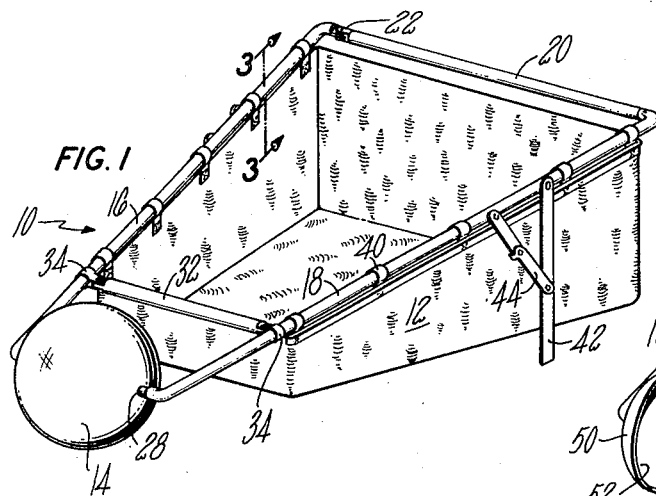
FIG.1
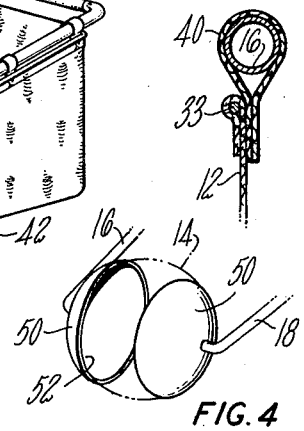
FIG.3
FIG.4
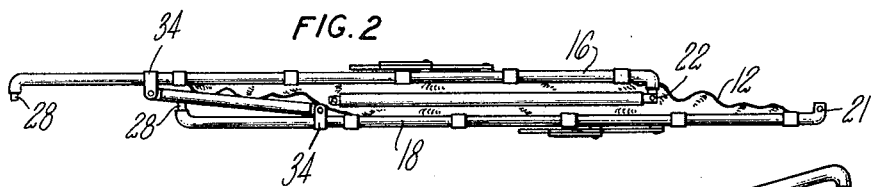
FIG.2
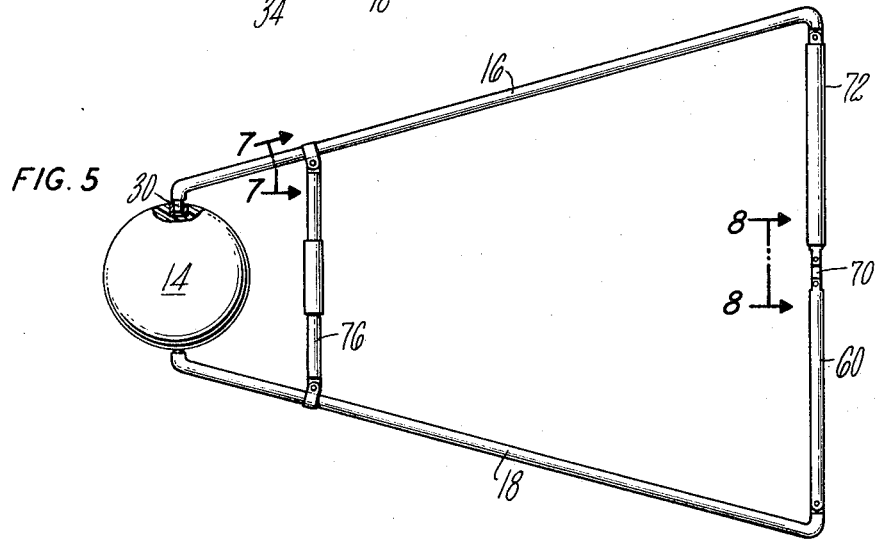
FIG.5
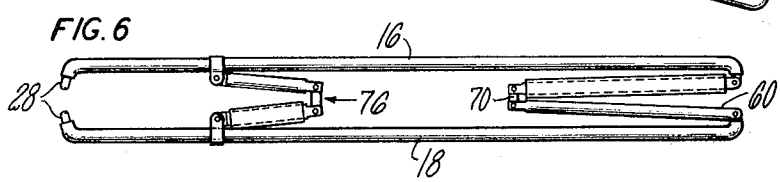
FIG.6
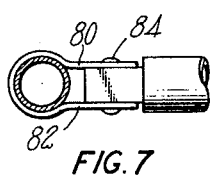
FIG.7
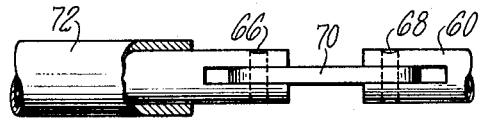
FIG.8

3,826,511

COLLAPSIBLE BEACH TOTE BARROW WITH BALL COMBINATION

BACKGROUND OF THE INVENTION

This invention relates to tote carts and particularly to the type that is adapted for use over unpaved surfaces.

There are several types of beach carts intended to carry equipment such as beach articles, foods and the like over sand or rough surfaces of beach-like areas appearing in the literature. The U.S. Pat. No. 3,693,993 granted to Peter Mazzarelli et al on Sept. 20, 1972 exemplifies one such cart. However, such heretofore known carts do not lend themselves to be easily stored since they do not collapse to a sufficiently compact unit and for the most part are bulky and cumbersome to handle. Additionally, none of these prior art carts show means for making the wheel readily available to be used as a beach ball or the like. By making the wheel out of suitable material and shaping it into a sphere and attaching it to the cart so that it is releasable in a quick and facile manner, not only permits the carts to be collapsible to a neatly compact unit, having the advantages of being easy to handle, particularly when placing in the trunk of an automobile and storing when not being used, but makes the wheel available for use as a play article when the cart is not in use.

SUMMARY OF THE INVENTION

It is an object of this invention to provide an improved beach tote cart or barrow.

A still further object of this invention is to provide a collapsible tote cart having the side frame elements positionable relative to each other.

A still further object of this invention is to provide in a collapsible beach tote cart a releasably secured wheel.

A still further object of this invention is to provide a combined beach tote cart having a releasably secured spherically shaped wheel capable of being used as a beach ball or the like.

A still further object of this invention is to provide in a combined beach tote cart a releasably secured wheel usable as a beach ball, means for securing the wheel to the frame so that it is simple to remove and replace.

A still further object of this invention is to provide for a collapsible beach tote cart a quickly detachable wheel shaped in the form of a beach ball or the like and providing disc like elements rotatably secured to the frame and spaced to accommodate the ball and frictionally retained therein when the cart is opened.

A still further object of this invention is to provide a combined beach tote cart and releasably secured spherically shaped wheel that is characterized as being simple and economical to manufacture and easy to use and store when not in use.

Other features and advantages will be apparent from the specification and claims and from the accompanying drawing which illustrates an embodiment of the invention.

BRIEF DESCRIPTION OF THE DRAWING

FIG. 1 is a perspective view of the cart in the opened position.

FIG. 2 is a plan view showing the cart in the closed or collapsible position.

FIG. 3 is a sectional view taken along line 3—3 of FIG. 1.

FIG. 4 is a partial view is perspective and partly in phantom illustrating another means for releasably securing the ball when mounted as a wheel.

FIG. 5 is a plan view, partly in section illustrating another preferred embodiment.

FIG. 6 is a plan view showing the embodiment of FIG. 5 in the closed position.

FIG. 7 is a sectional view taken along lines 7—7 of FIG. 5; and

FIG. 8 is a view partly in section and partly in elevation taken along lines 8—8 of FIG. 5.

DESCRIPTION OF THE PREFERRED EMBODIMENT

The tote cart is best illustrated in FIGS. 1 through 3 being comprised of a frame generally illustrated by reference numeral 10, a bag 12 and wheel-ball combination 14. The frame 10 is preferably fabricated from tubular aluminum material of the type commonly used for beach or lawn furniture and comprises a pair of side support elements 16 and 18 being angularly spaced relative to each other when in the opened position so that one end, or forward end terminates adjacent the wheel and the opposite end or carrying end terminates at the cross bar 20. Cross bar 20 is suitably hinged by pin 22 to the side support element 16 and is used as the handle as well as serving to hold the frame in position. The diameter of the end remote from the hinge of cross bar 20 is slightly smaller than the inner diameter of the tubular aluminum so that it snugly fits into side element 18 and held firmly thereon. A ball type spring biased clasp mounted thereon may fit into opening 21 formed in side support element 18 if additional locking means are necessary.

The forward end of the side support elements are bent radially inwardly to face each other or define a pair of trunnion or stub shafts 28 and spaced apart sufficiently to receive and accommodate ball 14. Ball 14, having a pair of diametrically opposed suitable recesses along an axis is rotatably supported by trunnions 28. The ball or wheel 14 which may be fabricated from any suitable material, such as that used for any well known beach ball may include inserts 30 having a low coefficient of friction to act as a suitable bearing. It being appreciated that the ball should be at least 16 inches in diameter in order to properly support the load when used in a finely granulated sand surface.

Cross bar 32 hingedly connected to side elements 16 and 18 by clamp and pin elements 34 holds the trunnions in proper spaced relation and helps to add rigidity to the structure when opened in the carrying position.

Bag 16 preferably formed from a canvas material although other material such as netting may be equally suitable, is supported to the frame by a plurality of straps 40 that wrap around the side elements 16 and 18 and are sewn to the canvas bag 12. The bag is not connected to either handle 20 or cross bar 32 so as not to interfere with the closing of the cart when placed in the collapsed position as shown in FIG. 2. As can be seen in FIG. 3 a bead 33 made from a fairly stiff material such as a stiff rope or metal rod may be sewn along the upper edge of bag 12 to add to the support thereof.

A pair of foldable legs 42 (only one being shown) may be hingedly connected to each side support element and extend downwardly to provide means to rest the cart. Any well known locking hinge 44 may be used to lock legs 42 in the position shown.

It is apparent from the foregoing that when the cart is in the collapsible position ball 14 is removed therefrom by moving the side support elements 16 and 18 apart, the aluminum being sufficiently resilient to allow for this movement, Once the ball is moved and the handle, likewise removed, the two side support elements are movable relative to each other by virtue of the hinged connections of the clamp-hinge elements 34. When folded the collapsible bag becomes folded upon itself and may be wrapped around the frame.

FIG. 4 shows another method of mounting the ball-wheel element 14 and eliminates the necessity of providing recesses in the ball. A pair of cup like elements 50 each having a contoured inner surface complementing the surface of the wheel 14 is suitably journalled and rotatably supported to elements 18 and 16. When the support elements are positioned apart to be in the cart carrying position, they pivot about the cross bar 32 to frictionally engage the outer surface of the ball and hence become the wheel.

FIGS. 5 through 8 show another embodiment of the invention having both the handle and cross bar pivotable at their mid-section. For the sake of clarity and simplicity it is to be understood that all like referenced numerals refer to similar elements in all the drawings. The handle is suitable hinged to side support elements 16 and 18 and is formed in two pieces, arm 62 and arm 64 each being hingedly supported by pins 66 and 68 to the flat element 70 as seen in FIG. 8. A tubular sleeve 72 fits over the arms 62 and 64 and serves to slide over the hinge connection flat element 70 to lock it into the cart carrying position. A similar locking and hinging means is made for the cross member 76 and since it is substantially the same as handle 60 a detail description is being eliminated herefrom for the sake of clarity and simplicity.

The clamp and hinge connection for supporting the cross bar 32 or 76 to the side support elements 16 and 18 is shown in FIG. 7. As noted the clamp and hinge 34 which may be made from sheet aluminum partially surrounds the tubular aluminum element and extends to form a pair of spaced parallel tangs 80 and 82. A pin or rivot 84 passes through aligned openings formed in the tangs 70 and 82 and through the tubular aluminum, the openings being sufficiently large to permit rotatable movement.

When has been shown by this invention is a beach tote cart fabricated from a minimum number of parts where the wheel is formed from a spherically shaped member that is releasably secured to the frame so that it can be used as a ball or other play thing. The means for supporting the ball deemed to be novel permits dismounting it from the frame. Since the main support elements move toward each other they collapse to a relatively compact member when the ball is removed, the carrying and storing thereof is greatly enhanced.

It should be understood that the invention is not limited to the particular embodiments shown and described herein, but that various changes and modifications may be made without departing from the spirit or scope of this novel concept as defined by the following claims.

I claim:

1. In a collapsible beach tote cart, the combination of a frame and a beach ball relatively secured thereby, comprising a pair of frame elements supporting a fabric bag pivotally attached by a first cross bar hinged to both of said frame elements intermediate their ends, said first cross bar having a pair of arms pivotally connected to each other and means for locking said arms in an extended position, a second cross bar pivotally connected to at least one of said elements at one end and means for securing said second cross bar to hold said frame in an opened position, said second cross bar forming a handle, the opposite end of said pair of frame elements being spaced sufficiently to accommodate a spherical shaped ball when in the opened position, means at each end extending inwardly of said frame elements to releasably support said spherical ball whereby said spherical ball serves as the wheel for said tote cart.

2. In a collapsible beach tote cart as claimed in claim 1 wherein said releasable support means for said spherical ball is a pair of disk-like shaped elements rotatably supported to said frame and are positioned to frictionally engage the said spherical ball to form a rotating wheel.

3. In a collapsible beach tote cart as claimed in claim 1 wherein said frame elements and cross bars are fabricated from tubular aluminum materials.

4. In a collapsible beach tote cart as claimed in claim 1 wherein said releasably support means includes trunnions adapted to fit into recesses formed in said spherically shaped ball at diametrically opposed ends taken along a center line.

* * * * *